(12) United States Patent
Van Winkle

(10) Patent No.: US 6,206,187 B1
(45) Date of Patent: Mar. 27, 2001

(54) ELECTRONIC DEVICE RETENTION CASE

(75) Inventor: Terry R. Van Winkle, Cos Cob, CT (US)

(73) Assignee: Sara Lee Corporation, Winston Salem, NC (US)

(*) Notice: Subject to any disclaimer, the term of this patent is extended or adjusted under 35 U.S.C. 154(b) by 0 days.

(21) Appl. No.: 09/442,377

(22) Filed: Nov. 17, 1999

(51) Int. Cl.$^7$ .................................................. B65D 85/38
(52) U.S. Cl. ........................... 206/320; 206/305; 211/26; 248/176.1
(58) Field of Search ...................... 206/305, 320; 211/13.1, 26, 26.1, 26.2; 248/176.1, 176.3, 346.03, 346.04

(56) References Cited

U.S. PATENT DOCUMENTS

| | | |
|---|---|---|
| 4,917,131 | 4/1990 | Contreras, Sr. . |
| 5,002,184 | 3/1991 | Lloyd . |
| 5,042,670 * | 8/1991 | Timberlake .......................... 211/26.1 |
| 5,186,375 * | 2/1993 | Plunk ................................ 206/305 X |
| 5,261,583 * | 11/1993 | Long et al. ....................... 206/305 X |
| 5,383,091 | 1/1995 | Snell . |
| 5,409,107 * | 4/1995 | Browne ................................ 206/305 |
| 5,450,993 * | 9/1995 | Guerrero et al. ................ 206/305 X |
| 5,533,809 * | 7/1996 | Gorman ........................... 206/320 X |
| 5,560,476 | 10/1996 | Lee . |
| 5,632,394 | 5/1997 | Mecca et al. . |
| 5,718,104 * | 2/1998 | Kennedy .......................... 206/305 X |
| 5,788,202 | 8/1998 | Richter . |
| 5,813,583 | 9/1998 | Benedeti . |

OTHER PUBLICATIONS

3COM website printout; 3COM.com., last updated Jun. 8, 1999, believed to be prior art.

* cited by examiner

Primary Examiner—Bryon P. Gehman
(74) Attorney, Agent, or Firm—Rhodes & Mason, P.L.L.C.

(57) ABSTRACT

A rotational toggle clip assembly disposed on a retention platform allows one portion of an electronic device such as a handheld computer to be inserted into a platform sleeve, also disposed on the retention platform, when the toggle clip is in a substantially open position. Opposite portions of the electronic device are secured to the platform via the case sleeve and the toggle clip following rotation of the toggle clip to its closed position. Rotation of the toggle clip to its closed position is accompanied by an audible click generated by the toggle clip assembly.

32 Claims, 4 Drawing Sheets

ELECTRONIC DEVICE RETENTION CASE

BACKGROUND OF THE INVENTION (1) Field of the Invention

The present invention relates generally to cases and protective covers for electronic devices and, more particularly, to a personal computer retention case having a toggle clip and case sleeve to maintain a personal computer within the case.

(2) Description of the Prior Art

Portable electronic devices such as personal computers, video game machines and hand held cameras, to name a few, generally have protective cases and covers designed to safely transport and store the respective devices. Generally, the particular electronic device is removed from its protective case or cover when it is desired to use the electronic device. The protective case or cover is then placed in a temporary location from which it is later retrieved for use when the particular electronic device is again ready for transport and/or storage. A common problem associated with such protective cases and covers for electronic devices relates to misplacement and loss of the protective case or cover while the particular electronic device is in use. The foregoing problem has been addressed for hard shell and non-fabric protective cases. For example, non-fabric protective cases for particular electronic devices have been formulated to provide access to the particular electronic device being stored therein such that the electronic device can be operated without removal from its protective case. One such protective case is disclosed in U.S. Pat. No. 5,002,184, entitled Soft Case Protection For A Hand Held Computer, issued Mar. 26, 1991, to Lloyd. However, such cases are often bulky and cumbersome, consuming undesirable amounts of limited space during use. Further, such cases generally have latching or insert structures that are not quickly or easily manipulated when it is desired to separate the electronic device from its protective case.

Thus, there remains a need for a new and improved fabric or soft-sided electronic device storage and transport (retention) case capable of removably attaching an associated electronic device when the retention case is open. Further, there remains a need for a quick-release mechanism capable of quickly, reliably and easily removably attaching an electronic device into a protective retention case.

SUMMARY OF THE INVENTION

The present invention is directed to a quick release mechanism for use with a storage and transport case, i.e., retention case, for an electronic device such as a personal organizer. One embodiment of the storage and transport case has an internal insert sleeve or other suitable means for removably and securely receiving one end of the electronic device within the case. Following insertion of the electronic device into the insert sleeve, the opposite end of the electronic device is securely fastened into the storage and transport case via a toggle clip. In this manner, the electronic device and its associated case become a single unit, even when the storage and transport case is opened and the end user is operating the electronic device. The toggle clip can be sized and formulated to work in combination with many different types of electronic devices to removably fasten the respective device into its associated retention case. In one embodiment, a toggle clip assembly includes a mounting base configured to be attached to or within a predetermined retention case. The mounting base has protrusions extending from the underside of the base configured to press fit with a plurality of openings disposed within or through a case base attached to or within an inner portion of the retention case. The mounting base can be removed by applying enough force to overcome the press fit formed between the protrusions in the mounting base and the plurality of openings in the case base. The case base preferably is attached to an inner portion of the retention case using an adhesive or other appropriate bonding technique. The embodiment of the mounting base has a pair of dowel pin anchors disposed on the top side of the mounting base and further has a leaf spring mechanism disposed there between. A toggle clip is configured to be rotatably and removably received between the dowel pin anchors. Following placement of the toggle clip between the dowel pin anchors, the toggle clip is removably and rotatably attached to the mounting base via a dowel pin formulated to slidably press fit into and through dowel pin holes disposed in the dowel pin anchors and the toggle clip. One embodiment of the toggle clip has an L-shape with an integral cam disposed on one end. The dowel pin hole in the toggle clip is disposed through the cam portion of the toggle clip such that rotation of the toggle clip between the dowel anchors also causes the cam to rotate against the leaf spring. The leaf spring is configured to flex downwardly as the cam rotates against it and also has a notch or recess configured to receive a protrusion disposed on the cam such that the cam protrusion can selectively enter or exit the notch as the cam rotates on its associated dowel pin. An audible click is produced when the cam protrusion completes its entry into the notch and the leaf spring snaps back against the smaller portion of the cam.

Another embodiment of the storage and transport case includes a platform; a retention sleeve attached to the platform that is configured to removably receive a first portion of a predetermined electronic device; and a toggle clip attached to the platform that is configured to rotate between an open position and a closed position to secure a second portion of a predetermined electronic device to a predetermined portion of the platform, such that opposite portions of an electronic device can be securely coupled to the platform by the retention sleeve and the toggle clip when the toggle clip is rotated to a substantially closed position. A fold-over sheath can also be utilized to completely or substantially enclose the platform, retention sleeve and toggle clip, as well as any electronic device retained via the retention sleeve and toggle clip, when the fold-over sheath is folded. The platform, retention sleeve and toggle clip are accessible to insert or remove a predetermined electronic device from the storage and transport case when the sheath is unfolded.

As described herein, the present invention includes provision of a retention case for a personal computer such as an electronic organizer wherein the retention case has a quick release mechanism for reliably, easily and quickly attaching and detaching the personal computer to and from the retention case.

Further, the invention is suitable for use with both hard and soft retention cases and is light weight and inexpensive to manufacture.

These and other aspects of the present invention will become apparent to those skilled in the art after a reading of the following description of the preferred embodiment when considered with the drawings.

DESCRIPTION OF THE PREFERRED EMBODIMENTS

Figure 1:
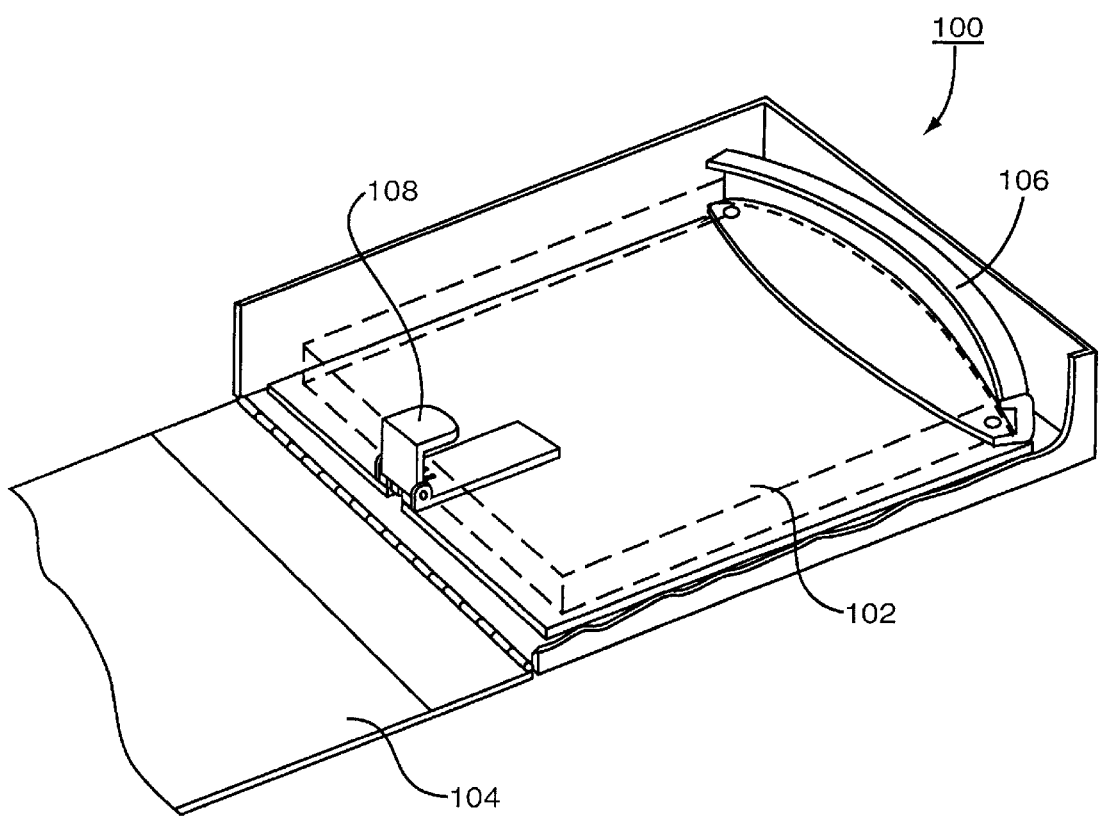
FIG. 1 is a perspective view illustrating a personal computing device such as a personal organizer attached to an open carrying case via a case sleeve at one end of the device and via a toggle clip at an opposite end of the device according to one embodiment of the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a perspective view 100 illustrates a personal computing device 102 (shown in dashed lines) such as a Palm™ or Palm Pilot™ organizer by 3Com Corporation of Santa Clara, Calif., attached to an open retention case 104 via a case sleeve 106 at one end of the device 102 and via a toggle clip 108 at an opposite end of the device according to one embodiment of the present invention. The case sleeve 106 is configured to removably receive a particular type of personal computing device 102 such as a personal organizer. The present invention is not so limited however, and it shall be understood that many other types of shapes can be used to formulate a case sleeve so long as the sleeve is capable of securely and removably receiving the desired personal computing device 102. Following insertion of the computing device 102 into the case sleeve 106, the opposite end of the computing device 102 is then securely fastened to the retention case 104 via a latching mechanism, preferably a toggle clip 108.

Figure 2:
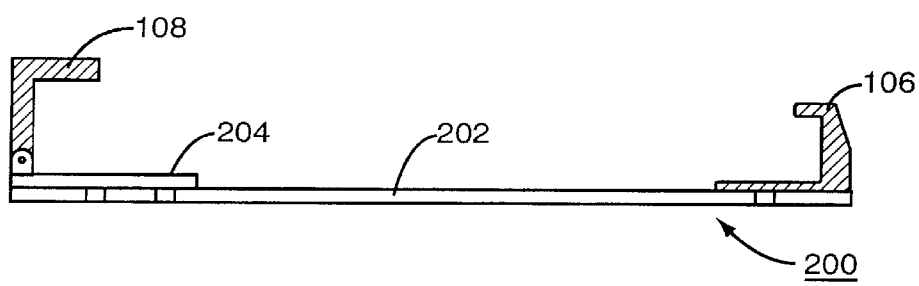
FIG. 2 is a side elevational view illustrating the case sleeve, toggle clip and toggle clip mounting base depicted in FIG. 1 attached to a common case base to form a unitary device according to one embodiment of the present invention.

Turning now to FIG. 2, there is shown a side elevational view illustrating the case sleeve 106 and toggle clip 108 depicted in FIG. 1 attached to a common mounting base 202 to form a unitary device 200 according to one embodiment of the present invention. The mounting base 202 can be permanently or temporarily attached to a predetermined retention case 104 that includes a fold-over cover to formulate a unitary device using attachment techniques familiar to those skilled in the art of fastening and bonding materials and methods. The toggle clip 108 is shown in its completely closed position wherein a predetermined personal computing device 102 is securely fastened into the retention case 104. The unitary device 200 further has a toggle clip base 204 that permits the toggle clip 108 to be rotatably coupled to the mounting base 202.

Figure 3:
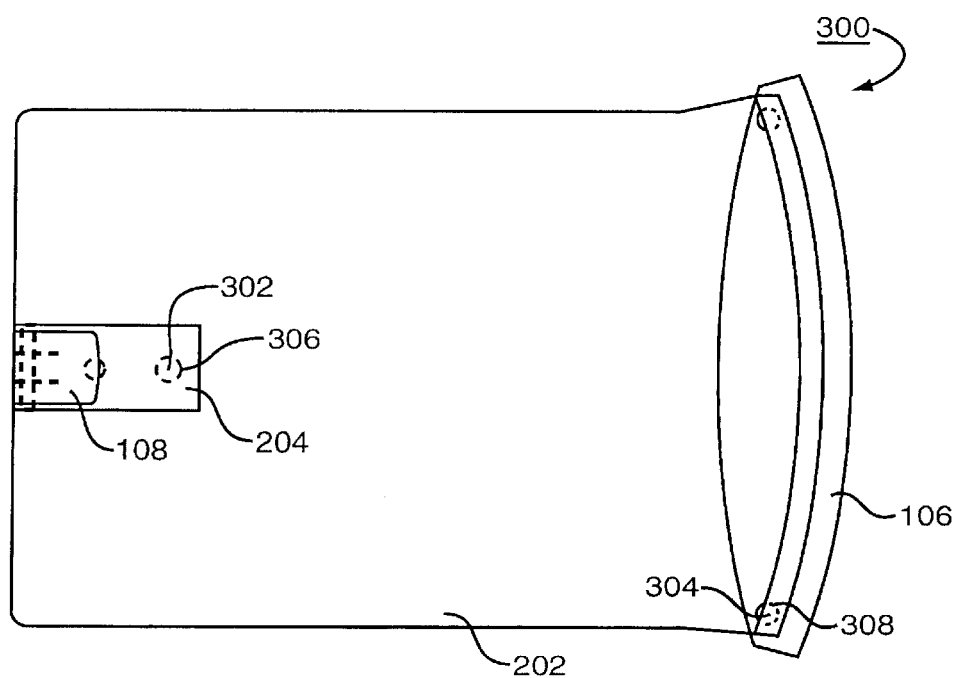
FIG. 3 is a top plan view of the case sleeve, toggle clip, toggle clip mounting base and case base illustrated in FIG. 2.

As best seen in FIG. 3, a top plan view 300 shows the lateral relationships between the case sleeve 106, toggle clip 108, mounting base 202 and toggle clip base 204 illustrated in FIG. 2. It shall be understood that other lateral relationships can also be used so long as the functional coupling relationship is retained between the ends of the computing device 102 and the computing device retention case 104. A predetermined set of mounting posts 302 attached to the toggle clip base 204 as well as a predetermined set of mounting posts 304 attached to the mounting base 202 are configured to press fit in one embodiment into a predetermined set of mating holes 306 and 308 configured to removably receive the mounting posts 302 and 304, respectively.

Figure 4A:
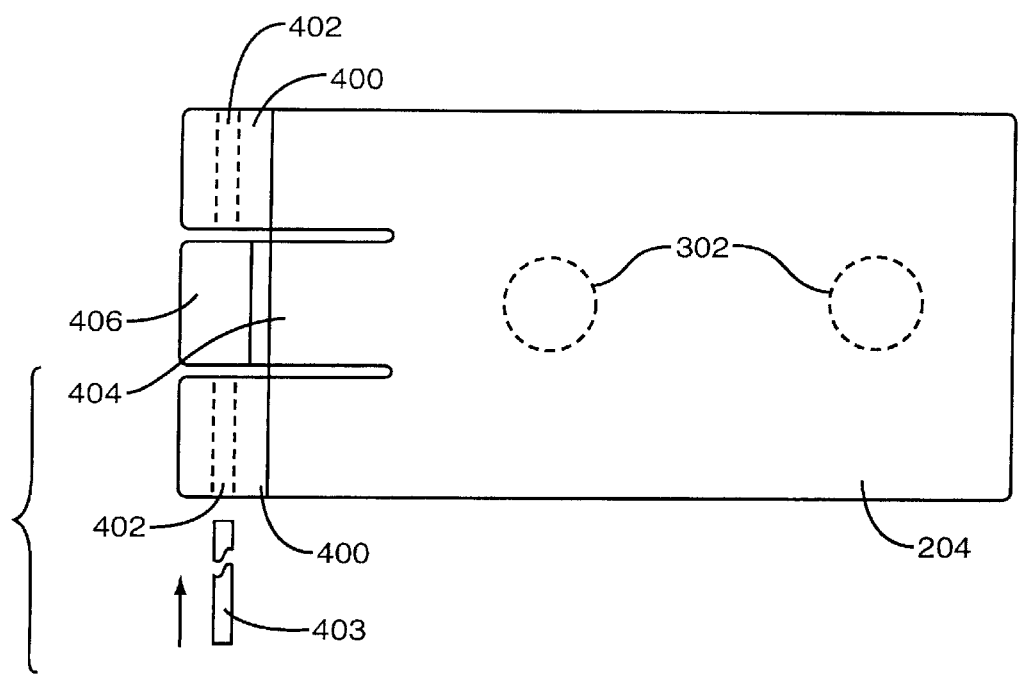
FIG. 4A is an enlarged top plan view of the toggle clip mounting base illustrated in FIG. 2 showing an integral leaf spring according to one embodiment of the present invention.
Figure 4B:
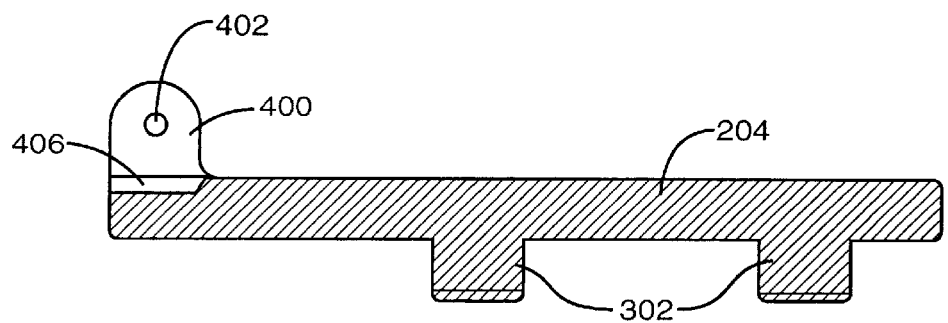
FIG. 4B is an enlarged side elevation view of the toggle clip mounting base illustrated in FIG. 4A showing a leaf spring notch for engaging the toggle clip.

As can be seen in FIGS. 4A and 4B, the toggle clip base 204 has a pair of dowel pin anchors 400 disposed at one end of the toggle clip base 204. Each dowel pin anchor 400 has a through hole 402 configured to slidably receive a dowel pin 403 therethrough. A leaf spring 404 is disposed between the pair of dowel pin anchors 400, and has a recess 406 disposed at its outmost extremity. The mounting posts 302 discussed above are seen disposed on the bottom of the toggle clip base 204. It shall be understood the toggle clip base 204 described herein can be formulated as a unitary device or optionally can be formulated as individual components that are fastened or coupled together to produce the desired functionality. Further, the embodiments described herein can be formulated using many different materials, e.g., plastics, metals, composites and the like and processes, e.g., molding, casting, forging, and the like.

Figure 5:
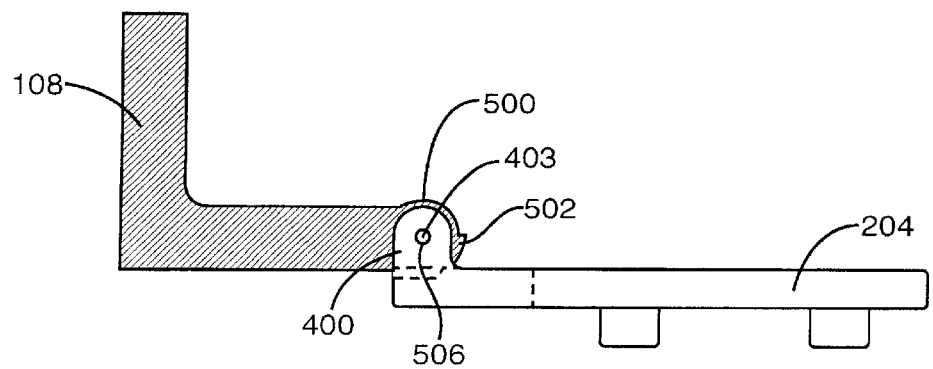
FIG. 5 is an enlarged side elevational view of the toggle clip and associated mounting base illustrating the toggle clip having a cam protrusion in a fully open position.

FIG. 5 is an enlarged side elevational view of the toggle clip 108 and toggle clip base 204 illustrating the toggle clip 108 having a cam 500 with a protrusion 502 disposed on one end of the toggle clip 108 in a fully open position. The cam 500 has a through hole 506 configured to slidably receive a dowel pin 403 passing through the dowel pin anchor through holes 402. The toggle clip 108 is rotatably coupled to and between the pair of dowel pin anchors 400 via the dowel pin 403 slidably received by the through holes 402 disposed in the dowel pin anchors 400 as well as the cam 500 through hole 506.

Figure 6:
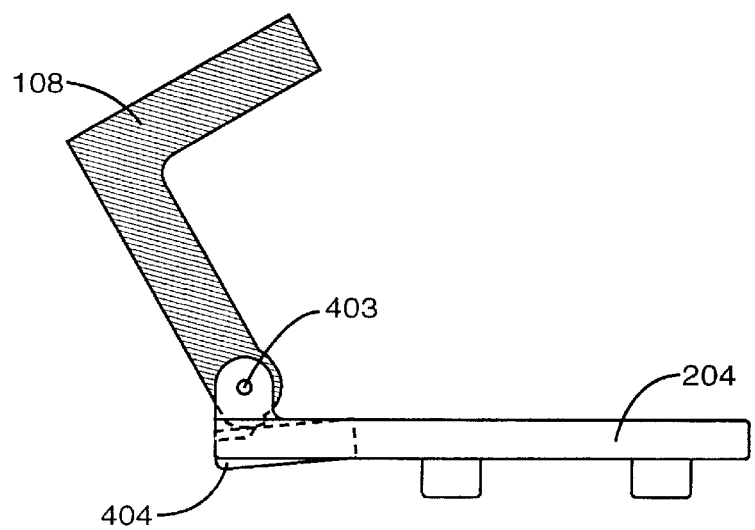
FIG. 6 is an enlarged side elevational view of the toggle clip and associated mounting base illustrating the toggle clip in a 30 degree open position depicting deflection of the leaf spring shown in FIGS. 4A and 4B.

FIG. 6 is an enlarged side elevational view of the toggle clip 108 and toggle clip base 204 illustrating the toggle clip 108 rotated approximately in a 30° position away from the horizontal. As the cam protrusion 502 moves against the leaf spring 404, the leaf spring 404 deflects downwardly away from a horizontal plane formed by the upper surface of the mounting base 204. The leaf spring 404 is comprised of a material having hysteresis properties such that the flexed leaf spring 40 automatically returns to its original unflexed position when a compressive force exerted by the cam 500 against the leaf spring is removed. A spring tension is thereby exerted by the leaf spring 404 against the cam 500 as the toggle clip 108 is rotated about the axis formed by the dowel pin 403.

Figure 7:
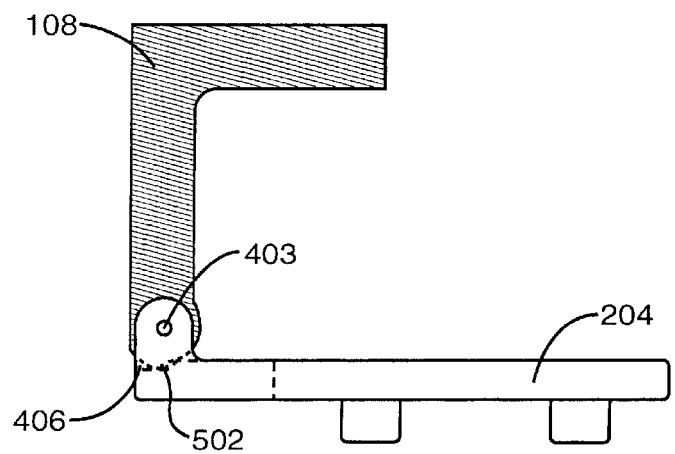
FIG. 7 is an enlarged side elevational view of the toggle clip and associated mounting base illustrating the toggle clip in a closed position depicting engagement of the toggle clip cam protrusion with the leaf spring notch shown in FIG. 4B.

FIG. 7 is an enlarged side elevational view of the toggle clip 108 and toggle clip base 204 illustrating toggle clip 108 in a fully closed position. As the cam 500 completes its rotation to the fully closed position, the cam protrusion 502 completes its entry into the leaf spring recess 406. Once the cam protrusion 502 has fully entered the leaf spring recess 406, it can no longer exert a spring force against the leaf spring 404. The leaf spring 404 will then quickly snap back into its original undeflected position shown in FIG. 5. The snapping action of the leaf spring 404 will cause the leaf spring 404 to quickly impact the low portion of the cam 500 such that an audible click is created to indicate the toggle clip has securely retained a predetermined personal computer device into the associated retention case.

Certain modifications and improvements will occur to those skilled in the art upon a reading of the foregoing description. By way of example, placement of the individual components such as the case sleeve and toggle clip can be altered to function with other types of devices. Also, the shapes disclosed herein can be altered aesthetically or otherwise so long as the desired functional locking characteristics are retained in association with a predetermined device retention case among other things. For example, the shape of the cam 500 including the protrusion 502 can be altered in many ways and still accommodate the functional locking characteristics in association with creation of an audible noise to alert the end user regarding the closing of the toggle clip. It should be understood that all such modifications and improvements have been deleted herein for the sake of conciseness and readability but are properly within the scope of the following claims.

What is claimed is:

1. A retention case comprising:
   a case sleeve disposed completely within the retention case and configured to removably receive a first end of a predetermined electronic device; and
   a toggle clip disposed completely within the retention case and configured to rotate between an open position and a closed position to secure a second end of a predetermined electronic device to an inner portion of the retention case, such that opposite ends of an electronic device can be securely retained within the retention case by the case sleeve and the toggle clip when the toggle clip is rotated to a substantially closed position.

2. The retention case according to claim 1 wherein the toggle clip comprises a cam.

3. The retention case according to claim 2, further comprising a toggle clip base configured to removably and rotatably receive the toggle clip cam.

4. The retention case according to claim 3 wherein the toggle clip base comprises a plurality of dowel pin anchors wherein each dowel pin anchor has at least one dowel pin hole disposed therethrough.

5. The retention case according to claim 3 wherein the toggle clip base further comprises a leaf spring.

6. The retention case according to claim 5 wherein the leaf spring has a recess configured to engage a first predetermined portion of the cam such that reverse rotational movement of a fully engaged cam is prevented until a predetermined angular force is applied against the toggle clip.

7. The retention case according to claim 6 wherein the leaf spring is configured to snap against a second predetermined portion of the cam to generate an audible click when the first predetermined portion of the cam initially completes engagement with the leaf spring recess.

8. The retention case according to claim 7 further comprising a case base configured to couple the case sleeve and the toggle clip base to a predetermined inner portion of the retention case.

9. A retention case comprising:
   means disposed completely within the retention case for removably receiving a first end of a designated electronic device; and
   latching means disposed completely within the retention case for securing a second end of a designated electronic device to a predetermined inner portion of the retention case such that opposite ends of a designated electronic device can be securely retained within the retention case by the receiving means and the latching means when the latching means engages the second end of a designated electronic device.

10. The retention case according to claim 9 wherein the means for removably receiving a first end of a designated electronic device comprises a case sleeve.

11. The retention case according to claim 9 wherein the latching means comprises a toggle clip configured to rotate between an open position and a closed position.

12. The retention case according to claim 11 wherein the toggle clip comprises a cam disposed on one end.

13. The retention case according to claim 12, further comprising a toggle clip base configured to rotatably receive the toggle clip cam.

14. The retention case according to claim 13 wherein the toggle clip base comprises a plurality of dowel pin anchors wherein each dowel pin anchor has at least one dowel pin hole disposed therethrough configured to removably receive a predetermined dowel pin.

15. The retention case according to claim 14 wherein the toggle clip base further comprises a leaf spring.

16. The retention case according to claim 15 wherein the leaf spring has a recess configured to engage a first predetermined portion of the cam such that the cam is substantially prevented from rotating against the leaf spring until a predetermined angular force is applied against the toggle clip.

17. The retention case according to claim 16 wherein the leaf spring is configured to snap against a second predetermined portion of the cam to generate and audible click when the first predetermined portion of the cam initially completes entry into the leaf spring recess.

18. The retention case according to claim 17 further comprising a case base configured to couple the case sleeve and the toggle clip base to a predetermined inner portion of the retention case.

19. A retention case comprising:
   a case sleeve disposed completely within the retention case, the case sleeve configured to removably receive one end of a predetermined electronic device;
   a toggle clip disposed completely within the retention case;
   a toggle clip base disposed completely within the retention case and configured to removably and rotatably receive the toggle clip such that the toggle clip can rotate between an open position and a closed position to secure a second end of a predetermined electronic device to an inner portion of the retention case and such that opposite ends of a predetermined electronic device can be securely retained within the retention case by the case sleeve and the toggle clip when the toggle clip is in a substantially closed position; and
   a leaf spring having a recess disposed at one end, the recess configured to engage a predetermined portion of the toggle clip such that the toggle clip is incapable of rotation between the open position and the closed position until a predetermined angular force is applied against the toggle clip.

20. The retention case according to claim 19 wherein the predetermined portion of the toggle clip that engages with the leaf spring recess comprises a cam disposed on one end of the toggle clip.

21. The retention case according to claim 20 wherein the leaf spring is configured to snap against the cam to generate an audible click when the cam portion of the toggle clip initially completes engagement with the leaf spring recess.

22. The retention case according to claim 19 further comprising a case base disposed completely within the retention case and configured to couple the case sleeve and the toggle clip base to a predetermined inner portion of the retention case.

23. A method for securing an electronic device inside a retention case, the method comprising the steps of:

providing a retention case having a case sleeve and a rotational latching mechanism, the case sleeve and latching mechanism configured to function in association with a predetermined electronic device;

rotating the latching mechanism to a substantially open position;

inserting one end of a predetermined electronic device into the case sleeve; and rotating the latching mechanism to a substantially closed position to engage an opposite end of a predetermined electronic device so as to allow for usage of the electronic device while the device is secured within the retention case.

24. The method of claim 23 further comprising the step of closing the retention case to substantially enclose the electronic device therein.

25. A retention case comprising:

a platform;

a retention sleeve attached to the platform and configured to removably receive a first portion of a predetermined electronic device; and a toggle clip attached to the platform and configured to rotate between an open position and a closed position to secure a second portion of a predetermined electronic device to a predetermined portion of the platform, such that opposite portions of an electronic device can be securely coupled to the platform by the retention sleeve and the toggle clip when the toggle clip is rotated to a substantially closed position.

26. The retention case according to claim 25, further comprising a fold-over sheath capable of substantially enclosing the platform, retention sleeve and toggle clip when the sheath is in a folded arrangement.

27. The retention case according to claim 25 wherein the toggle clip comprises a cam.

28. The retention case according to claim 27, further comprising a toggle clip base configured to removably and rotatably receive the toggle clip cam.

29. The retention case according to claim 28 wherein-the toggle clip base comprises a plurality of dowel pin anchors wherein each dowel pin anchor has at least one dowel pin hole disposed therethrough.

30. The retention case according to claim 29 wherein the toggle clip base further comprises a leaf spring.

31. The retention case according to claim 30 wherein the leaf spring has a recess configured to engage a first predetermined portion of the cam such that reverse rotational movement of a fully engaged cam is prevented until a predetermined angular force is applied against the toggle clip.

32. The retention case according to claim 31 wherein the leaf spring is configured to snap against a second predetermined portion of the cam to generate an audible click when the first predetermined portion of the cam initially completes engagement with the leaf spring recess.

* * * * *